Aug. 16, 1966 J. J. FERRETTI 3,266,224
GAS PURIFICATION APPARATUS
Filed Aug. 13, 1963 3 Sheets-Sheet 2
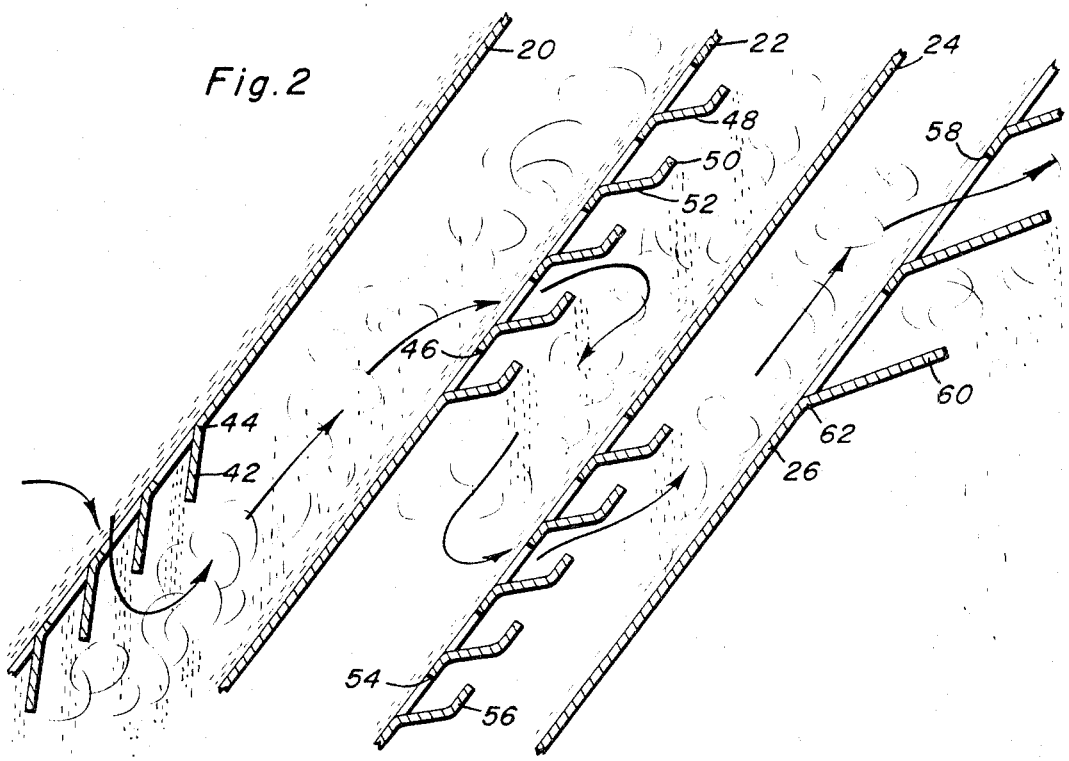
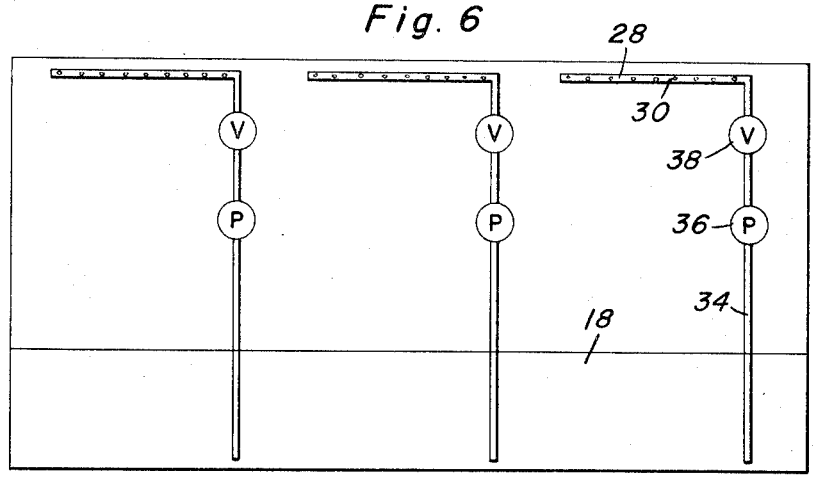
Julius J. Ferretti
INVENTOR.
BY Clarence A. O'Brien
and Harvey B. Jacobson
Attorneys

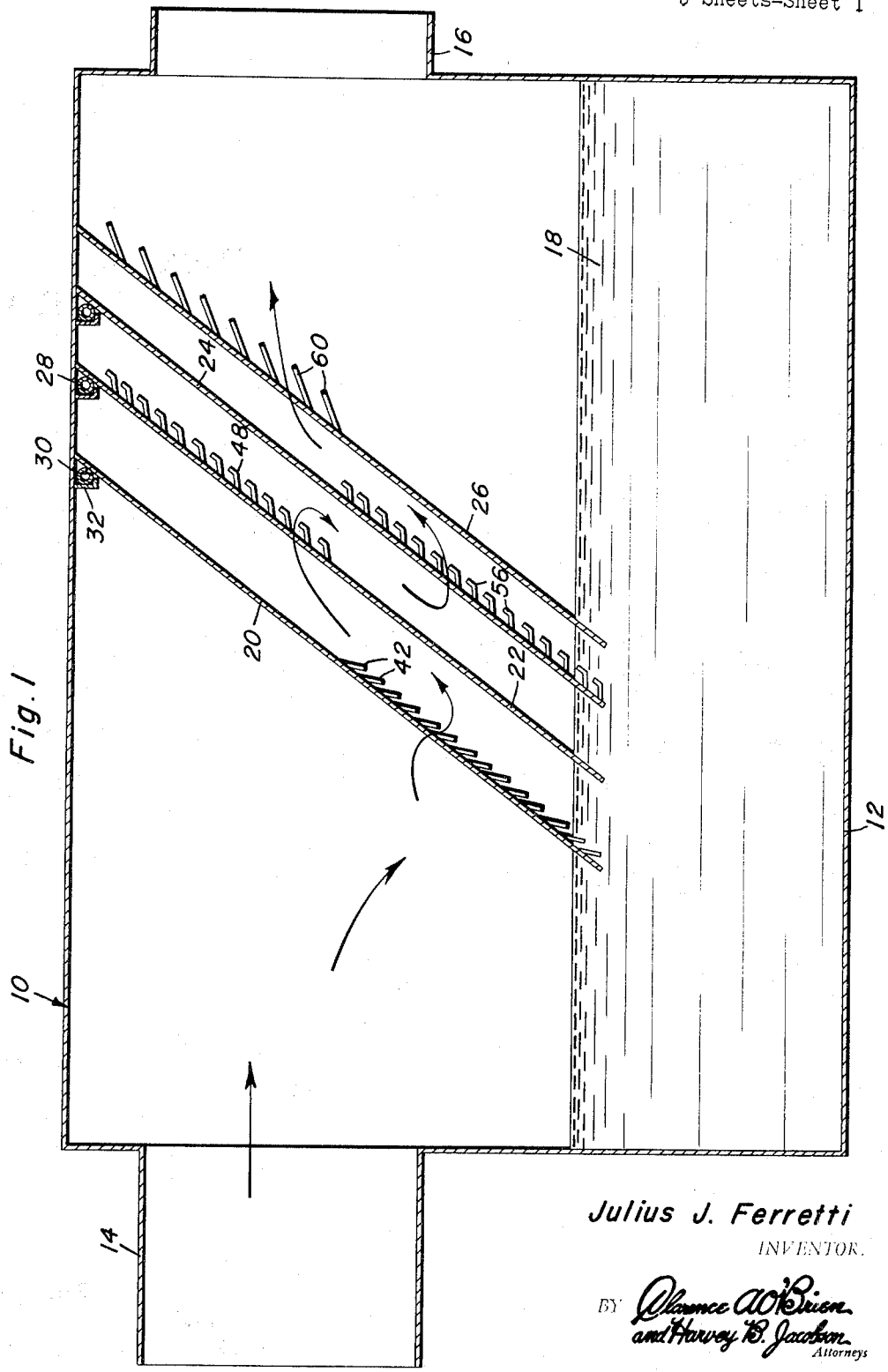

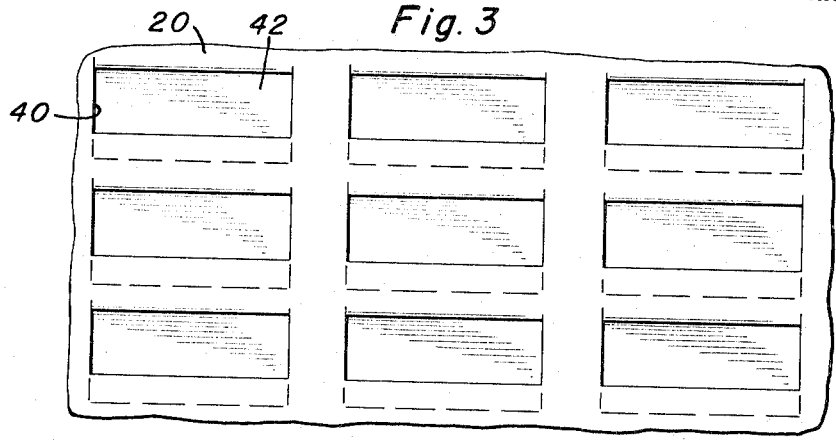
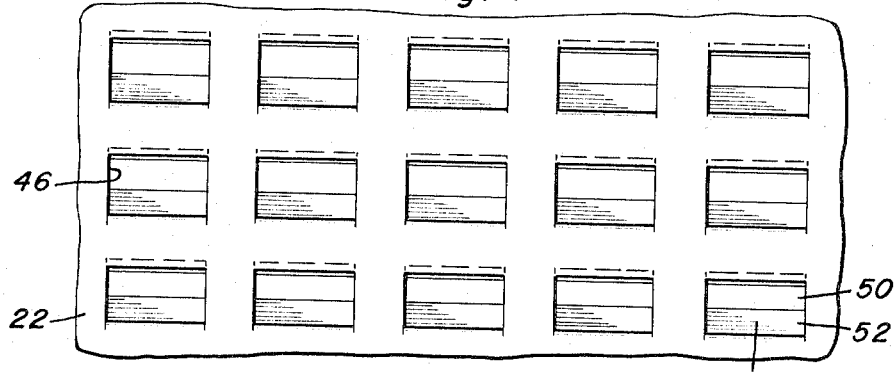
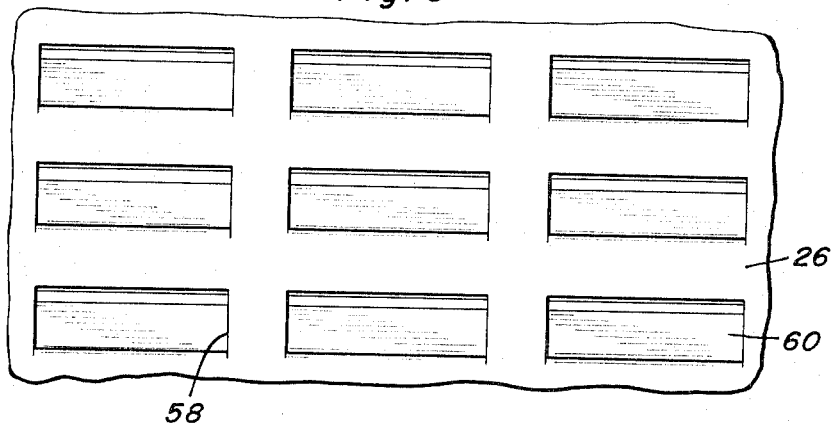

United States Patent Office 3,266,224
Patented August 16, 1966

3,266,224
GAS PURIFICATION APPARATUS
Julius J. Ferretti, Mineola, N.Y., assignor to
J. W. Todd Ferretti, New York, N.Y.
Filed Aug. 13, 1963, Ser. No. 301,809
3 Claims. (Cl. 55—241)

The present invention generally relates to gas purification apparatus and more particularly to a device specifically constructed for but not limited to use as a smoke scrubber or cleaner of the general category of liquid-gas contact scrubbers.

An object of the present invention is to provide a novel gas purification apparatus in the form of a liquid-gas contact scrubber incorporating in its construction a plurality of baffles which have particularly shaped and orientated openings through which the gas to be cleaned or scrubbed is passed together with means for causing a scrubbing liquid to pass downwardly along the baffle surfaces for bringing the scrubbing liquid into intimate scrubbing contact with the gases.

Another object of the present invention is to provide a gas purification apparatus of the liquid-gas contact scrubbing type incorporating a series of baffles or separator plates having apertures orientated therein in a particular manner and having a particular shape together with deflectors on the trailing side of the apertures with respect to the gas flow for deflecting the gas generally in the direction which it must travel during passage through the baffles or separator plates.

Another object of the present invention is to provide a gas purification apparatus in accordance with the preceding objects in which the apparatus has no moving parts insofar as the gas purification function thereof is concerned. The separator plates or baffles are constructed to permit the maximum contact between a liquid and a gas thereby producing a highly efficient heat transfer, a highly efficient air filtering, cleaning and scrubbing function and otherwise serving to effectively purify the gases. The separator plates are inclined and each separator plate has its own functions. The apertures provided in the separator plate are substantially completely covered by a body of fluid which due to its motion acts somewhat as a siphon which, while in motion, will carry the gases in bubble form thus performing a very simple but very intimate contact between the liquid and air.

The number of separator plates and their spatial relationship may be varied depending upon the functions thereof and the type of gases being cleaned or purified. Also, the quantity of the liquid and the quantity or purified status of the gases cleaned by the purification apparatus may be varied depending on the functions thereof. For example, by varying the quantity of cleaning liquid passing over each of the separator plates, the desired end result may be accomplished. Various particles may be separated from the gases including particles of sub-micron size to recovery of precious minerals or the like. In effect, all dirt regardless of the size of the particles may be separated or removed from the gases.

The gas purification apparatus of the present invention may be constructed of any suitable material such as various plastics, minerals, metals or the like which may be coated with chemicals or other coatings to resist any chemical reaction with the gases and liquids being employed thus enabling the device to be employed for various purposes and remain impervious to any deleterious action from the materials being employed.

Another important factor in the present invention is the spatial relationship between the separator plates to provide chambers including a mixing chamber depending on the quantity of liquid as compared with the quantity of gas and the duty or functions to be performed. This is also true of the apertures in each separator pipe as to their size and shape and also as to their orientation in the separator plate and each of the apertures perform somewhat of a squeezing action as the gases pass therethrough.

A very important object of the present invention is to provide a gas purification apparatus incorporating a structure in which gases passing through the apparatus must actually penetrate a wall of liquid travelling generally in a vertical direction while the gases are travelling generally in a horizontal direction with the gases being temporarily moved with the liquids until the mixture thereof is passed through the apertures in the separator plates.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a rather schematic sectional view of the gas purification apparatus of the present invention illustrating the association of the separator plates, the apertures therein and the deflectors associated with the apertures;

FIGURE 2 is an enlarged fragmental sectional view illustrating further structural details of the separator plates and their orientation together with the relative positioning of the openings and deflectors in the separator plate;

FIGURE 3 is an enlarged fragmentary view of the approach surface of the first separator plate;

FIGURE 4 is an enlarged fragmentary view of an approach surface of the second or third separator plate;

FIGURE 5 is an enlarged fragmentary view of the approach surface of the last separator plate; and FIGURE 6 is a schematic view illustrating the circulating pump and control valve together with the perforated discharge tube for discharging the liquid in relation to the separator plate.

Referring now to the drawings, the gas purification apparatus 10 includes a housing or casing 12 of any suitable configuration which for the purposes of description may be parallelepiped in configuration and provided with an inlet conduit or duct 14 at one end thereof and an outlet conduit or duct 16 at the other end thereof with the ducts 14 and 16 being adjacent the upper end of the end walls of the casing or housing 12. Disposed within the casing 12 is a supply of liquid 18 and extending transversely of the casing 12 is a plurality of separator plates 20, 22, 24 and 26. The separator plates are all disposed in parallel relation to each other and are all inclined with the lower end being disposed closer to the inlet duct 14 than the upper end thereof. Orientated at the upper end of each of the separator plates 20, 22 and 24 is a transversely extending tube 28 having a plurality of perforations or openings 30 formed therein for discharge of liquid 18 against the surface of the separator plates 20, 22 and 24 that face the inlet duct 14. A supporting bracket 32 is provided for each of the tubes 28 and the separator plates 20, 22, 24 and 26 are supported from the casing in any suitable manner whereby the separator plates or baffles may be removed if desired for replacement, cleaning, inspection or the like.

As illustrated in FIGURE 6, each of the perforated tubes 28 is connected with a supply tube 34 having an inlet end disposed within the liquid 18. A suitable pump 36 is provided in the supply pipe 34 and a control valve 38 is also provided in the supply pipe 34 for controlling the discharge of the pump 36 thereby controlling the quantity of liquid discharged from each of the three perforated tubes or pipes 28 thereby varying the quantity of liquid discharged onto the leading surface of the separator plates 20, 22 and 24.

The separator plate 20 is provided with a plurality of apertures 40 therein as illustrated in FIGURES 2 and 3 with the apertures being generally rectangular in configuration and having the major axis thereof disposed horizontally and being formed by striking out a portion of the separator plate 20 and deforming it rearwardly to form a deflector 42 which depends substantially vertically when the separator plate 20 is in its inclined normal position as illustrated in FIGURE 2. The struck out deflector 42 may be severed from the plate 20 along its bottom edge and along the two side edges and then bent rearwardly along the top edge as at 44 until the proper angle has been achieved which will dispose the deflector 42 substantially vertically when the separator plate 20 is in its normal inclined position.

The separator plate 22 also is provided with a plurality of apertures 46 which are of rectangular configuration but which have a lesser longitudinal dimension than the apertures 40 in the separator plate 20 and a slightly greater vertical dimension or lateral dimension as compared with the apertures 40 in the separator plate 20. Each of the apertures 46 is also provided with a deflector 48 which includes an offset end portion 50 generally paralleling the separator plate 22 and an inclined portion 52 connecting with the separator plate 22 and with the end portion 50 whereby the free edge of the deflectors 48 are disposed upwardly.

The separator plate 24 is provided with apertures 54 which are identical to the apertures 46 and also provided with deflectors 56 comparable to the deflectors 50 on the separator plate 22.

As illustrated in FIGURE 1, the apertures 40 and deflectors 42 on the separator plate 20 are orientated only over the lower half of the separator plate 20. The separator plate 22 has apertures 46 and the deflectors 48 orientated only in the upper half thereof while the separator plate 24 has the apertures 54 and deflectors 56 only along the bottom half thereof thus providing a tortuous path for the flow of gases through the separator plates.

The separator plate 26 has a plurality of apertures 58 only along the upper half thereof and the apertures 58 are substantially rectangular and are each provided with a deflector 60 attached thereto along the bottom edge as at 62 with the deflector 60 being formed in the same manner as the deflectors 42 and the deflectors 60 are upwardly angulated at a lesser angle from the horizontal than the separator plate 26 as illustrated in FIGURES 1 and 2.

The spatial distance between the separator plates may be varied as determined by the duty to be performed and this is also true of the size, shape and quantity of apertures. The chamber formed between the separator plates 20 and 22 is a mixing chamber and the space between separator plates 24 and 26 is a separating chamber.

As the gas contacts the leading surface of the separator plate 20, the gas and liquid mixes as they enter the apertures. The mixtures of the gas and liquid continues in the chamber between the separator plates 20 and 22 and there is an inverted action of gas flow since the gas and liquid mixture must then proceed upwardly along the surface of the separator plate 22 past the apertures 46 therein. The face of the plate which faces the gas flow is smooth thus permitting the liquid to flow over the apertures as evenly as possible and not encounter any obstacles thereby performing a complete intimate mixing and contact of the gases and liquid.

The purpose of the separator plate 20 is to admix the gases and liquids as illustrated in FIGURE 2. Since there are no other openings other than the openings 40, both the gas and air must enter the mixing chamber through the openings where the mixed gases and liquids begin a mixing action. Upon entering the mixing chamber, the liquid, being heavier falls and will carry with it on the way to the tank, the heaviest particles contained in the gases and because of the obstacle formed by the separator plate 22 adjacent the bottom of its travel, the movement of the liquid downwardly due to its heavier weight will remove smaller particles from the gases as well as the larger particles. In other words, the gases must penetrate a wall of water which travels practically vertically wherein the gases must travel horizontally. Therefore, the gases are induced to follow the liquid path until they reach one of the openings and escape to the next chamber.

The gas and liquid contact continues through the separator plates 22 and 24 and the chamber formed therebetween and as the gases leave the separator plates 24 they are still saturated and the separator plate 26 is in the form of a moisture eliminator for the purpose of separating the liquid and gases so that the liquid may be recirculated by the circulating pump. In lieu of recirculating the liquid, a constant flow of clean liquid may be employed depending upon the functions of the apparatus. The constant flow also would have a supply or overflow provision so that the bottom ends of the separator plates would be constantly immersed in the liquid to provide a gas seal so that the gas will necessarily have to pass through the separator plates.

The number in sequence of the separator plates may be varied, the spatial relationship between the separator plates may be varied, the number and orientation, size and shape of the apertures in each of the separator plates may be varied, the quantity of liquid circulated over the approach surfaces of the separator plates may be varied as may the velocity of the gases passing therethrough. All of these factors may be varied in order to determine the scrubbing action of the liquid when in contact with the gas.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a device for purifying gas apparatus comprising a casing having end walls, side walls, a bottom wall and a top wall, an inlet duct provided in one of said end walls and an outlet duct provided in the other of said end walls, said inlet and outlet ducts being adjacent said top wall; at least three parallel separator plates disposed transversely within the casing, in an abutting, sealing relationship with the side walls and top wall of the said casing, said plates having their bottom edges spaced above said bottom wall and being inclined so that the bottom edges are closer to the inlet than the upper edges thereof, the lower portion of said casing containing a supply of liquid having a height greater than the lower level of said separator plates such that said separator plates divide said casing into a series of parallel chambers, each of said separator plates having a plurality of apertures therein to provide communication between the said chambers, said apertures in the first of said separator plates are situated only in the lower portion of said separator plates and the apertures in the second of said separator plates are situated in the upper portion of said separator plate, with such sequence of openings being repeated for the remainder of said separator plates to provide a zigzag path of flow for the gases as they travel through the casing, each of said apertures having deflectors adjacent thereto, said deflectors being struck out of and attached to said separator plate on the downstream surface thereof, in relation to the intake end of said casing, to direct the flow of the gases from one adjacent separator plate to the next adjacent separator plate, the free edge portion of said struck-out deflectors on the first of said separator plates extending in a first direction, the free edge portions of the struck-out deflectors on each of the remainder of the plates extending in a second direction substantially different from said first direction, and means to discharge a sheet of liquid down the upstream surface of at least two separator plates so as to mix the gas and liquid as they pass through the chambers defined by said separator plates.

2. Apparatus as defined in claim 1 wherein said last mentioned means comprises a discharge head positioned immediately adjacent the top of each of the said separator plates which will have the liquid flowing down its face, conduit means interconnecting said discharge heads and the supply or liquid in the lower portion of said casing, and means to pump liquid through said conduit means directly from the supply of liquid on the lower portion of said casing to said discharge heads.

3. The structure as defined in claim 1 wherein the separator plate nearest the outlet duct is free of any liquid supply means thereby forming a separation plate for separating the liquid from the gases.

References Cited by the Examiner

UNITED STATES PATENTS

| | | | |
|---|---|---|---|
| 910,045 | 1/1909 | Donaldson | 55—257 |
| 1,088,187 | 2/1914 | Theisen | 55—446 X |
| 1,187,208 | 6/1916 | Wahl | 55—244 X |
| 1,899,018 | 2/1933 | Dauphinee | 55—242 |

FOREIGN PATENTS

| | | |
|---|---|---|
| 869,306 | 1/1942 | France. |
| 312,997 | 6/1919 | Germany. |
| 335,604 | 4/1921 | Germany. |
| 877,263 | 9/1961 | Great Britain. |

HARRY B. THORNTON, *Primary Examiner.*

L. H. McCARTER, *Examiner.*